United States Patent
Dominici et al.

(10) Patent No.: US 9,182,597 B2
(45) Date of Patent: Nov. 10, 2015

(54) OPTICAL GUIDE FOR COLLIMATED IMAGES WITH OPTICAL BEAM DOUBLER, AND ASSOCIATED OPTICAL DEVICE

(71) Applicant: Thales, Neuilly sur Seine (FR)

(72) Inventors: Johanna Dominici, Eysines (FR); Philippe Augereau, Cestas (FR); Philippe Coni, Saint Jean D'illac (FR)

(73) Assignee: Thales, Neuilly sur Seine (FR)

( * ) Notice: Subject to any disclaimer, the term of this patent is extended or adjusted under 35 U.S.C. 154(b) by 92 days.

(21) Appl. No.: 14/105,135

(22) Filed: Dec. 12, 2013

(65) Prior Publication Data

US 2014/0160577 A1    Jun. 12, 2014

(30) Foreign Application Priority Data

Dec. 12, 2012    (FR) ...................................... 12 03377

(51) Int. Cl.
| | |
|---|---|
| G02B 27/14 | (2006.01) |
| G02B 27/01 | (2006.01) |
| G02B 27/00 | (2006.01) |
| G02B 27/10 | (2006.01) |
| F21V 8/00 | (2006.01) |

(52) U.S. Cl.
CPC .......... *G02B 27/0101* (2013.01); *G02B 6/0035* (2013.01); *G02B 27/0081* (2013.01); *G02B 27/106* (2013.01); *G02B 6/0028* (2013.01); *G02B 2027/0125* (2013.01)

(58) Field of Classification Search
USPC .......................................... 359/629, 630, 633
See application file for complete search history.

(56) References Cited

U.S. PATENT DOCUMENTS

| | | |
|---|---|---|
| 2003/0165017 A1 | 9/2003 | Amitai |
| 2004/0130797 A1 | 7/2004 | Leigh Travis |
| 2012/0176682 A1 | 7/2012 | DeJong |

FOREIGN PATENT DOCUMENTS

| | | |
|---|---|---|
| FR | 2 662 821 A1 | 6/1991 |
| FR | 2 937 152 A1 | 4/2010 |
| WO | WO 2009/009268 A1 | 1/2009 |
| WO | WO 2011/024291 A1 | 3/2011 |

OTHER PUBLICATIONS

French Search Report for French Counterpart Application No. FR 1203377, 7 pgs. (Sep. 27, 2013).

*Primary Examiner* — Jack Dinh
(74) *Attorney, Agent, or Firm* — Blakely, Sokoloff, Taylor & Zafman LLP

(57) ABSTRACT

The general field of the invention is that of optical guides for collimated images comprising a first and a second image conductor functioning by total reflection, each conductor comprising a plurality of plates that are planar, semi-reflective, mutually parallel and inclined with respect to the plane of the external faces of the image conductors. The two conductors are arranged so as to deliver a collimated image to a large pupil. The optical guide according to the invention comprises an optical beam doubler element having substantially the shape of a rectangular parallelepiped. In its basic version, it comprises four external planar facets, two internal semi-reflective planar mirrors, said mirrors being mutually perpendicular, a planar entrance face intended to receive a collimated image, and an exit face adhesively bonded to the injection section of one of the image conductors. The invention also relates to the whole of the display device associated with this optical guide.

8 Claims, 6 Drawing Sheets

US 9,182,597 B2

OPTICAL GUIDE FOR COLLIMATED IMAGES WITH OPTICAL BEAM DOUBLER, AND ASSOCIATED OPTICAL DEVICE

BACKGROUND OF THE INVENTION

1. Field of the Invention

The field of the invention is that of optical guides used for transporting a collimated image. These guides may notably be used for the production of ocular vision optical systems. These systems make it possible to overlay an image output by a micro-display on the outside landscape. Its applications relate to the mass-market sector as well as the field of aeronautics.

2. Description of the Prior Art

A display system comprising such a guide is schematically shown in FIG. 1. It comprises a small imager 1, collimating optics 2 and the optical guide 10. The function of the optical guide is to convey the collimated image to the eye of the user while creating the minimum of visual disturbances and while being as discrete, small and light as possible. In its basic version, it comprises a plate 11 with planar and parallel faces of small thickness in which a semi-reflective plate 12 is inserted. This plate causes only a very slight disturbance of the vision of the outside. The light beams output by the displayer propagate by total reflection inside the optical guide, are reflected by the semi-reflective plate 12 and exit the optical guide towards the eye of the user O. They are symbolized by discrete arrows in FIG. 1 and the following figures.

If the optical guide 10 comprises only a single semi-reflective plate, the observer O can see only a narrow portion of the image, the pupil of the system being situated far from the eye and being by nature small in size. In order to palliate this drawback in a given dimension, the number of semi-reflective plates 12 is increased as indicated in FIG. 2, which shows a cut-away view of an optical guide 10 comprising a plurality of semi-reflective plates 12. These semi-reflective plates are all perfectly mutually parallel.

For certain applications, notably those requiring wide fields of vision, it is necessary to further enlarge the pupillary zone in both dimensions of the space. In this case, as illustrated in FIG. 3, which shows a perspective view of a guide giving such a pupil, the optical guide 10 is composed of two primary optical elements 20 and 30. The first element 20 is a first optical guide with planar and parallel faces, comprising several first semi-reflective plates 12 that are mutually parallel and make it possible to enlarge the pupil in a first given direction. The second element 30 is a second optical guide with planar and parallel faces, comprising several second semi-reflective plates 31 that are mutually parallel and make it possible to enlarge the pupil in a second direction perpendicular to the first direction. The two guides meet at a common face 22 and form a single plate with planar and parallel faces.

Such optical guides still have one drawback. Each parallel light beam representing a given field must be large enough to "cover" the entirety of the planar faces of the guide when successive total internal reflection on these same faces occurs, in such a way that the set of beams reflected by the successive semi-reflective plates totally covers a pupil zone without "holes". However, if the guide only comprises semi-reflective plates, it is possible that this may not be the case. As may be seen in FIG. 4, which shows a cut-away view of a light guide 10 comprising three mutually parallel, inclined semi-reflective plates 12, although the light beams cover the whole entrance pupil of the guide the beams reflected by the various plates do not cover a homogenous zone.

To solve this problem, several technical solutions have been proposed. The patent FR 2-937 152 entitled "Dispositif de guidage optique d'un faisceau lumineux" (Device for optical guiding of a light beam) proposes to enlarge the injection section of the light beams arranged at the input of the optical guide. This solution makes it possible to enlarge the injection section in one dimension of space but is more difficult to apply to two dimensions of space. Patent application WO 2009/009 268 entitled "Substrate-guided relays for use with scanned beam image sources" proposes to introduce, into the interior of the waveguide, a plate that is planar, semi-reflective and parallel to the planar external faces of the guide, making it possible to double beams incident on this plate in a give direction. The reader should refer to FIGS. 3A, 3B and 3C of this application for details regarding propagation of the light beams inside the optical guide. Patent application EP 0 399 865 entitled "Dispositif optique pour l'introduction d'une image collimatée dans le champ visuel d'un observateur et casque comportant au moms un tel dispositif" (Optical device for the introduction of a collimated image into the field of vision of an observer and helmet comprising at least one such device) also proposes to insert a plate that is planar, semi-reflective and parallel to the planar external faces of the guide with the same aim. The reader should in particular refer to FIG. 1 of this patent. Finally, patent FR 2 662 821 entitled "Ensemble optique pour l'introduction, en surimpression, d'une image dans le champ visuel d'un observateur et casque comportant au moins un tel ensemble" (Optical assembly for the introduction, in superposition, of an image in the field of vision of an observer and helmet comprising at least one such assembly) is an improvement of the preceding application. The particularity of the light guide claimed is that it comprises both a plate that is planar, semi-reflective and parallel to the planar external faces of the guide and a concentration "block" formed by a stack of planar mirrors the surfaces of which are perpendicular to said planar external faces. The reader should refer to FIGS. 2 and 3 of this patent for geometrical details.

An image guide with internal semi-reflective plates is a complicated optical component to manufacture. It is composed of numerous processed and adhesively bonded optical elements which after assembly, must exhibit perfectly planar surfaces with extremely precise orientations. Optical guides of the prior art, to solve the problem of pupillary "holes", add various components to the inside of the optical guide, rendering its manufacture complicated and expensive, and introducing a possible source of parasitic images.

SUMMARY OF THE INVENTION

The optical guide for the transport of a collimated image according to the invention does not have these drawbacks. It adds, upstream of a two-dimensional guide, a simple component that makes it possible to fill pupillary "holes" and to obtain a homogenous exit pupil.

More precisely, the subject of the invention is an optical guide for collimated images comprising:
  a first image conductor having substantially the shape of a rectangular parallelepiped and comprising two first faces that are planar and mutually parallel, two second faces that are planar and mutually parallel and perpendicular to the two first planar faces, a plurality of first plates that are planar, semi-reflective, mutually parallel and inclined with respect to the plane of the two first planar faces, and an injection section;
  a second image conductor having substantially the shape of a planar plate comprising two third faces that are planar and mutually parallel and arranged in the extension of the two second planar faces, a fourth face that is planar, perpendicular to the second planar faces and joined to one of the two first planar faces, a plurality of second plates that are planar, semi-reflective, mutually parallel and inclined with respect to the plane of the two third planar faces;

characterized in that the guide comprises an optical beam doubler element, said doubler element having substantially the shape of a rectangular parallelepiped, and comprising two first facets that are planar and mutually parallel—two second facets that are planar, mutually parallel and perpendicular to the two first planar facets, a first mirror that is semi-reflective, planar and arranged at a first preset distance from one of the two first planar facets and parallel to the latter, a second mirror that is semi-reflective, planar and arranged at a second preset distance from one of the two second planar facets and parallel to the latter, a planar entrance face that is intended to receive a collimated image, and an exit face coincident with or in the vicinity of the injection section.

Advantageously, the doubler element comprises two first mirrors that are semi-reflective, planar and arranged at two first preset distances from one of the two first planar facets, said two first semi-reflective planar mirrors being mutually parallel and parallel to said first planar facets; and two second mirrors that are semi-reflective, planar and arranged at two second preset distances from one of the two second planar facets, said two second semi-reflective planar mirrors being mutually parallel and parallel to said second planar facets.

Advantageously, the doubler element comprises three first mirrors that are semi-reflective, planar and arranged at three first preset distances from one of the two first planar facets, said three first semi-reflective planar mirrors being mutually parallel and parallel to said first planar facets; and three second mirrors that are semi-reflective, planar and arranged at three second preset distances from one of the two second planar facets, said three second semi-reflective planar mirrors being mutually parallel and parallel to said second planar facets.

Advantageously, the doubler element comprises four first mirrors that are semi-reflective, planar and arranged at four first preset distances from one of the two first planar facets, said four first semi-reflective planar mirrors being mutually parallel and parallel to said first planar facets; and four second mirrors that are semi-reflective, planar and arranged at four second preset distances from one of the two second planar facets, said four second semi-reflective planar mirrors being mutually parallel and parallel to said second planar facets.

Advantageously, in a first variant, the injection section is arranged on the fifth face of the first image conductor.

Advantageously, in a second variant the injection section is situated on one of the two first planar faces or on one of the two second planar faces.

The invention also relates to an optical device comprising optical means arranged to form a collimated image, and an optical guide as defined above, characterized in that, the collimated image being composed of parallel light beams, the optical means are arranged so that each of the beams is inclined by a non-zero value with respect to the normal to the entrance face, none of the beams possessing any beam symmetrical with respect to said normal.

Advantageously, the minimum length of the first semi-reflective mirror and the minimum length of the second semi-reflective mirror are equal to the value of the greatest length of the entrance face divided by the tangent of the minimum angle of inclination of the light beams inside the doubler element.

BRIEF DESCRIPTION OF THE DRAWINGS

The invention will be better understood and other advantages will become apparent on reading the following non-limiting description, and by virtue of the appended figures among which.

DETAILED DESCRIPTION

For the sake of clarity, and to allow the geometrical surfaces of the doubler element and those of the image conductors to be distinguished between, the external surfaces of the doubler are called "facets" and those of the image conductors "faces". Similarly, the internal semi-reflective surfaces are called "plates" for the image conductors and "mirrors" for the doubler element. Of course, the optical functions are the same, only the terminology changing.

Figure 1:
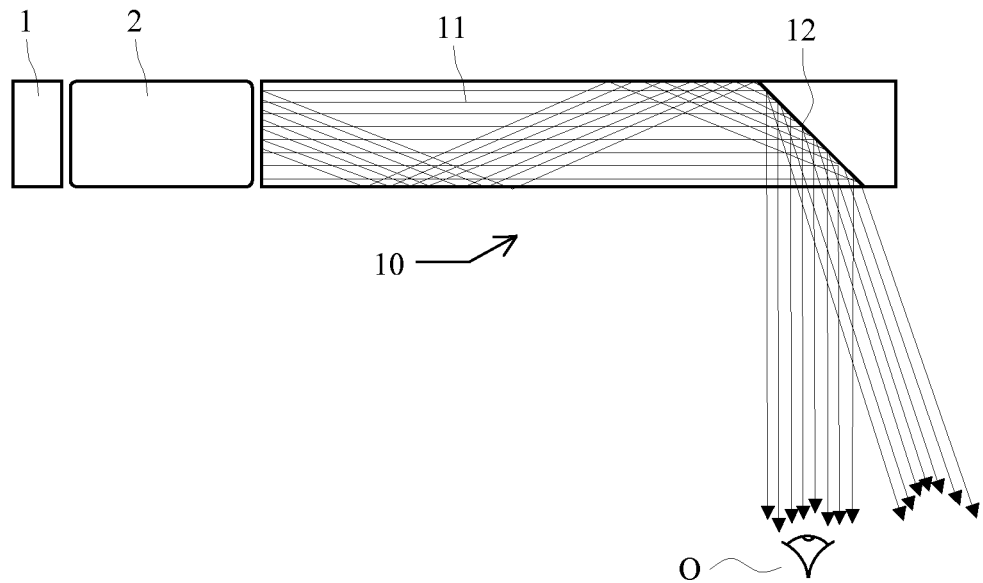
FIG. 1 shows a first image guide with a single semi-reflective plate.
Figure 2:
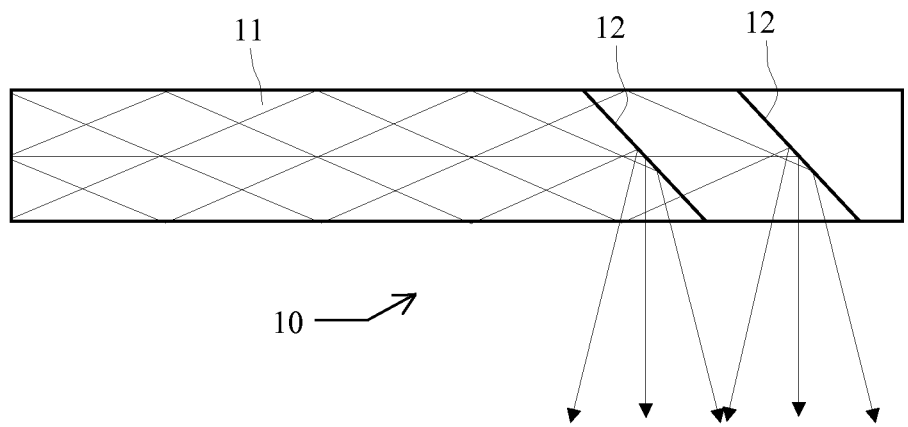
FIG. 2 shows a second image guide with two semi-reflective plates.
Figure 3:
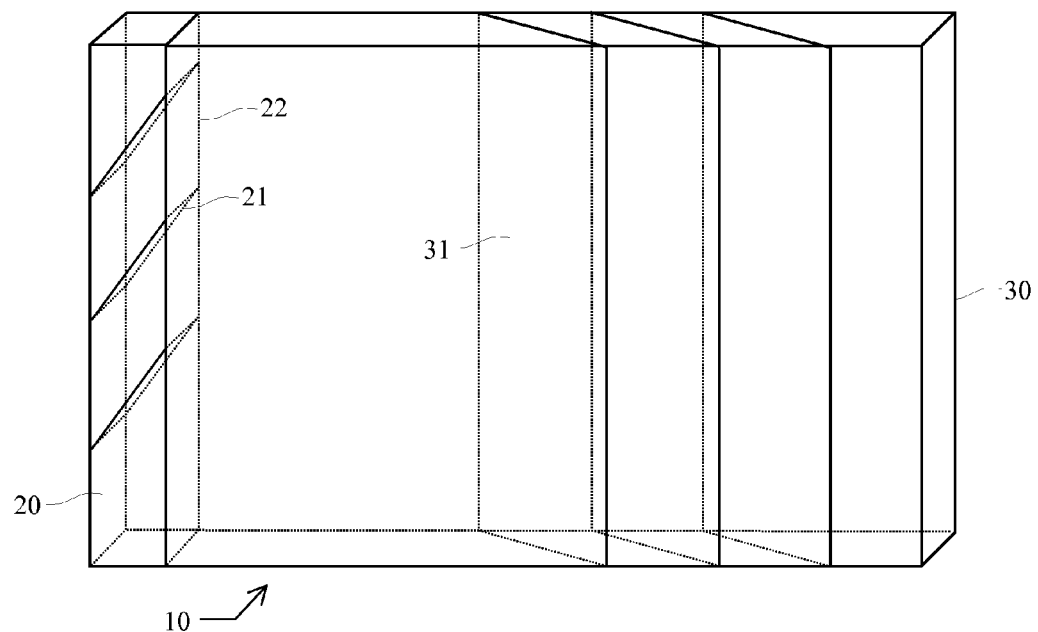
FIG. 3 shows a third image guide comprising two image conductors arranged perpendicularly.
Figure 4:
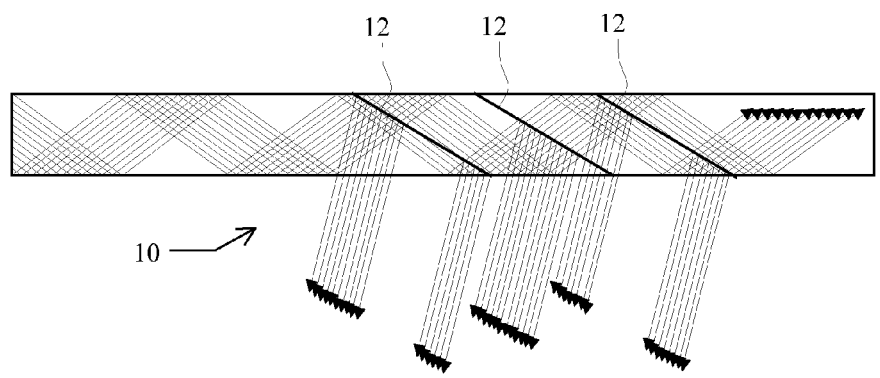
FIG. 4 shows the passage of light rays through an image guide comprising several semi-reflective plates.
Figure 5:
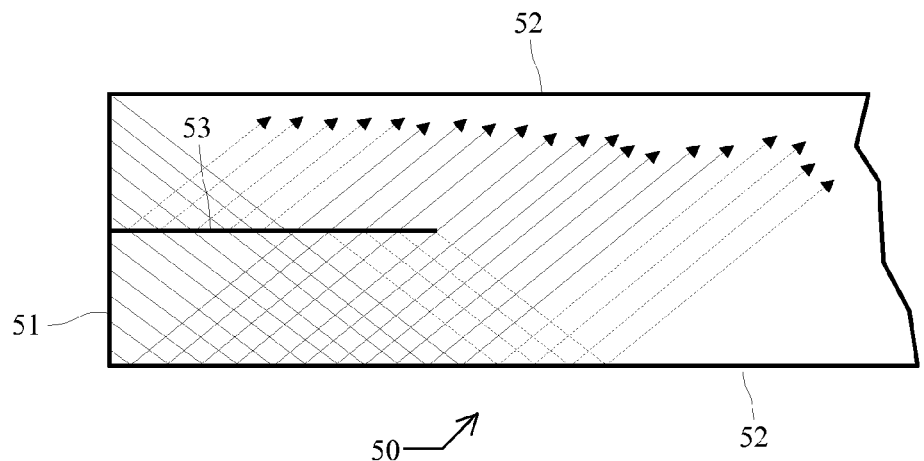
FIG. 5 shows the operating principle of a doubler element according to the invention.

FIG. 5 shows the general operating principle of the doubler optical element according to the invention. This FIG. 5 shows a partial cut-away view of a doubler element 50. This view shows the entrance face 51, two planar mutually parallel facets 52, and a semi-reflective planar mirror 53 that is arranged parallel to said planar facets and equidistant from the latter. Light beams, represented by discrete arrows, cover the whole of the entrance face and propagate inside the guide by total reflection from the two planar facets. As may be seen in FIG. 5, the beams are doubled by reflection from the semi-reflective mirror. These beams are represented by dotted lines in FIG. 5. Thus, the cross-section of the light beams inside the doubler element is doubled. This makes it possible to prevent "holes" appearing in the pupillary zone in one dimension of the space.

To double the cross-section of the beams in both dimensions of the space, the optical doubler according to the invention has substantially the shape of a rectangular parallelepiped. Such a doubler is shown in perspective in FIG. 6. In its basic version, it comprises two first facets 52 that are planar and mutually parallel, two second facets 54 that are planar, mutually parallel and perpendicular to the two first planar facets, a first mirror 53 that is semi-reflective, planar and arranged at a first preset distance from one of the two first planar facets and parallel with the latter, a second mirror 55 that is semi-reflective, planar and arranged at a second preset distance from one of the two second planar facets and parallel to the latter, a planar entrance face 51 intended to receive a collimated image, and an exit face 56.

Figure 7:
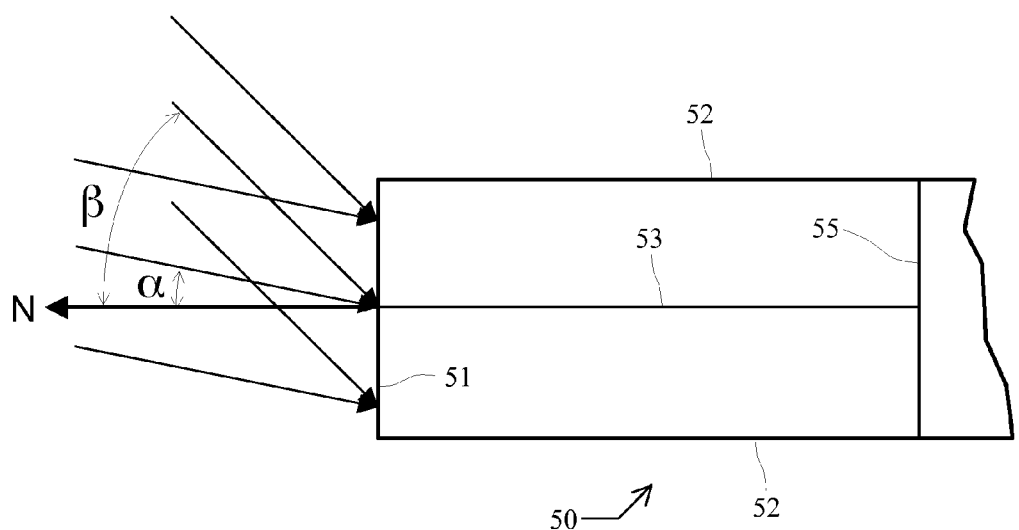
FIG. 7 shows the admissible incidence of the light beams composing the collimated image on the entrance face of the doubler element according to the invention.

A doubler according to the invention is used with an optical device comprising optical means arranged to form a collimated image. This collimated image is composed of light beams. The incidence of these beams on the entrance face of the doubler must be such that, by reflection from one of the two semi-reflective planar mirrors, a reflected beam does not have the same incidence as a direct beam. Each of the beams must therefore be inclined by a non-zero value with respect to the normal N to the entrance face 51, and must not possess a beam that is symmetrical with respect to this normal. In other words, the directions of all the light beams must not occupy more than one quarter of the space. FIG. 7 illustrates this principle. FIG. 7 shows a cut-away view of an optical doubler element 50 according to the invention. In this cut-away view, the incidence of light beams is comprised between the angles α and β, these two angles being on the same side of the normal N to the entrance face.

In the case where the doubler comprises only two semi-reflective mirrors, so that the semi-reflective mirrors function optimally, the minimum length L of the first semi-reflective mirror and the minimum length of the second semi-reflective mirror are equal to the value of the greatest length h of the entrance face divided by the tangent of the minimum angle θ of inclination of the light beams inside the doubler element. This gives the equation:

$$L = \frac{h}{\tan(\theta)}$$

Figure 8:
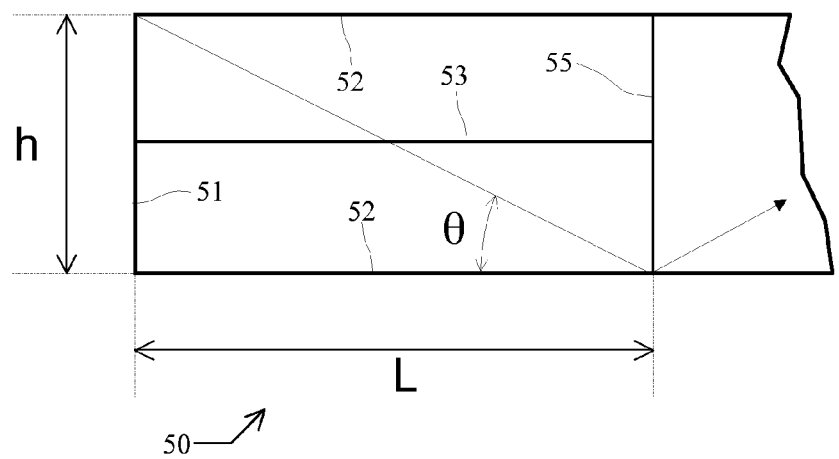
FIG. 8 shows the determination of the optimum length of the semi-reflective mirrors internal to the doubler element according to the invention, in the case where the doubler element comprises only two semi-reflective mirrors.

FIG. 8 shows a cut-away view of an optical doubler element according to the invention, in which these various parameters are shown.

Figure 9:
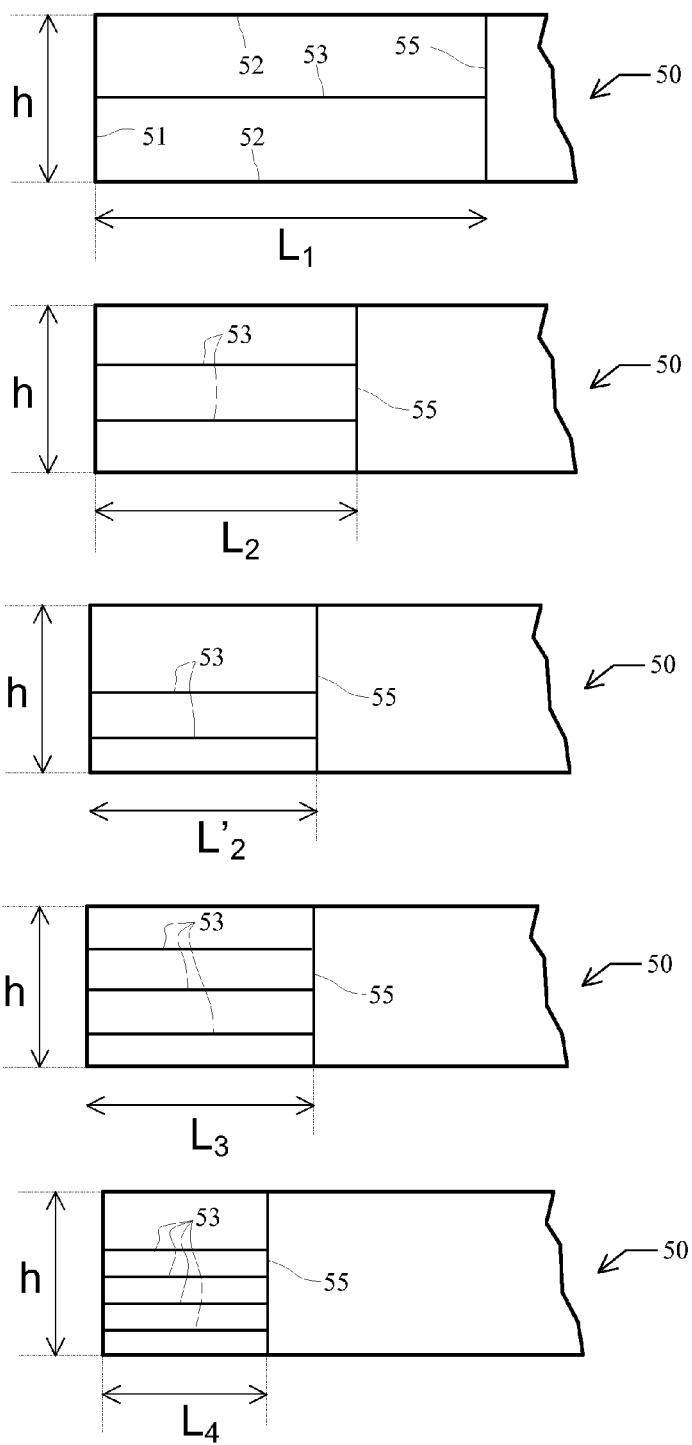
FIG. 9 shows the variation of the optimum length of the semi-reflective mirrors internal to the doubler element according to the invention, in the case where the doubler element comprises more than two semi-reflective mirrors.

It is possible to decrease the length L of the doubler by multiplying the number of semi-reflective mirrors inside the doubler, as may be seen in FIG. 9 which shows, as a cut-away view, and from top to bottom, five different doubler configurations.

The first doubler 50 configuration comprises, as previously described in FIG. 8, a first semi-reflective mirror 53 and a second semi-reflective mirror 55. The length of the doubler has a value $L_1$.

The second doubler configuration comprises two first semi-reflective mirrors 53 and two second semi-reflective mirrors 55. The length of the doubler has a value $L_2$ that is less than $L_1$. In this configuration, the semi-reflective mirrors are arranged equidistant from one another.

The third doubler 50 configuration is a variant of the previous one. It comprises two first semi-reflective mirrors 53 and two second semi-reflective mirrors 55. In this configuration, the semi-reflective mirrors are arranged at various distances from one another. It has been shown that the length of the doubler has a value $L'_2$ which is less than $L_2$.

The fourth doubler 50 configuration comprises three first semi-reflective mirrors 53 and three second semi-reflective mirrors 55. In this configuration, the semi-reflective mirrors are arranged equidistant from one another. It has been shown that the length of the doubler has a value $L_3$ which is less than $L_2$.

Finally, the fifth doubler 50 configuration comprises four first semi-reflective mirrors 53 and four second semi-reflective mirrors 55. In this configuration, the semi-reflective mirrors are arranged at various distances from one another. It has been shown that the length of the doubler has a value $L_4$ which is less than $L_3$. It is thus possible to decrease the length of the doubler by a factor of 3 relative to the length of a doubler with two semi-reflective mirrors. The determination and optimization of the optimum distances separating the various semi-reflective mirrors can be carried out by means of ray tracing optical software, the propagation of rays of light by successive transmission and reflection inside the doubler being simple.

Figure 10:
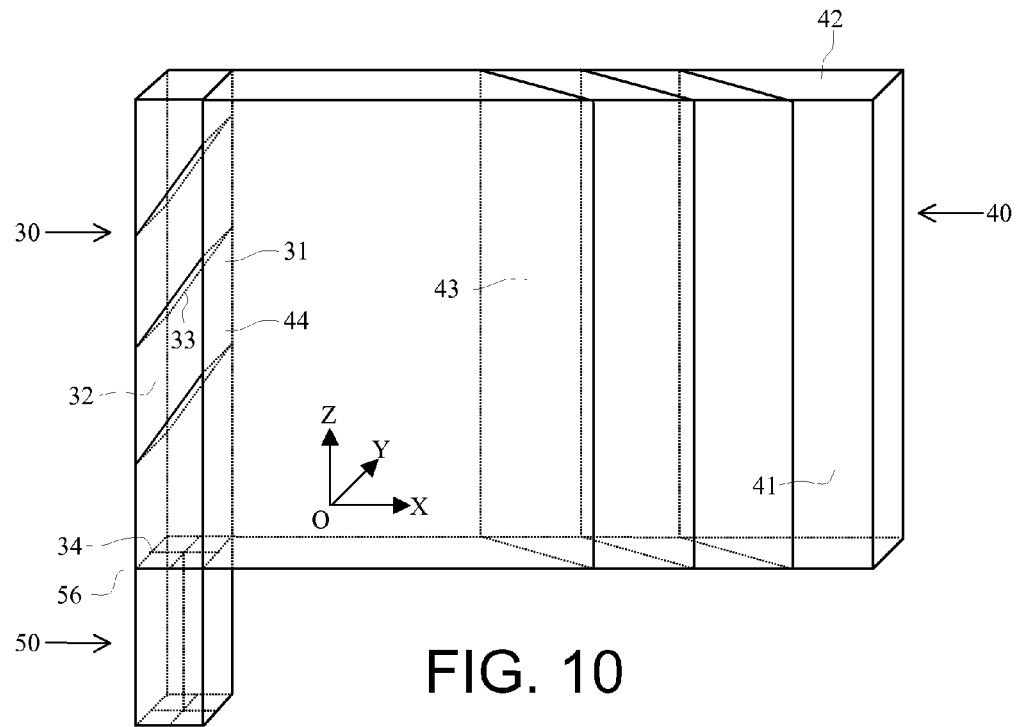
FIGS. 10 and 11 show, in perspective, two possible embodiments of an optical guide according to the invention.
Figure 11:
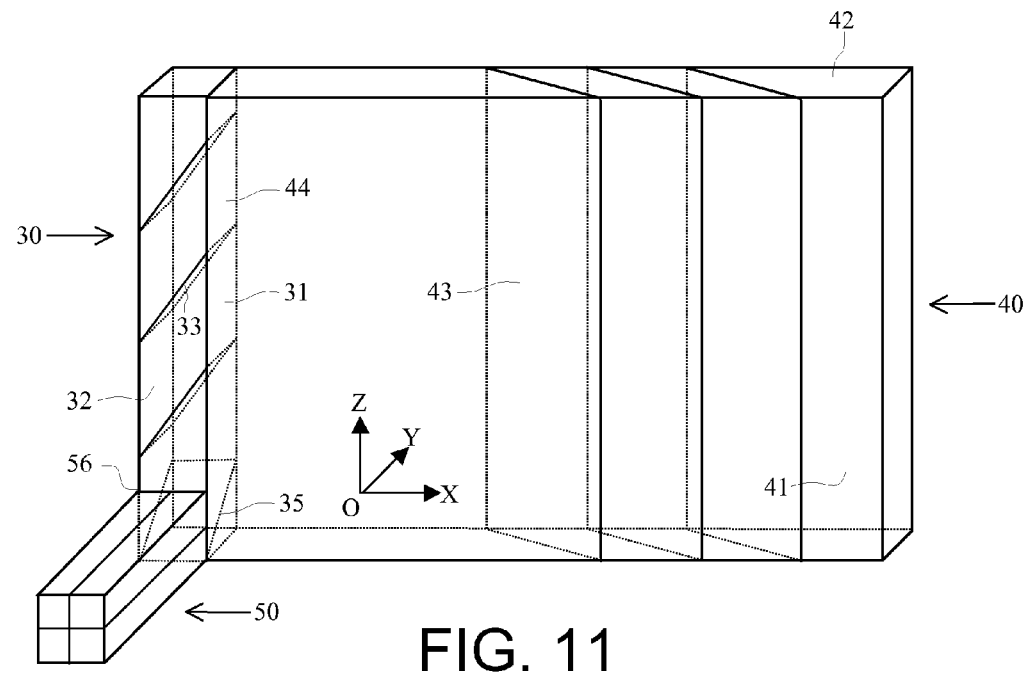

By way of non-limiting examples, FIGS. 10 and 11 show, in perspective, two possible set-ups of an optical guide according to the invention. In these figures, the various dimensions of the optical components are given by way of indication. An optical guide of this type, which is intended to be placed in front of the eye of a user, typically has a thickness comprised between two and five millimeters, a length of a few centimeters and a height of one to two centimeters. Similarly, the two light conductors that compose the guides in these figures each contain three semi-reflective plates. This figure is given by way of indication, bearing in mind that an increase in the number of the semi-reflective plates necessarily increases the complexity of the optical component to be produced. FIGS. 9 and 10 are located in a frame of reference (O, X, Y, Z).

The optical guides shown comprises two image conductors 30 and 40 and a doubler element 50. Only the set-up of the doubler 50 differs between FIG. 9 and FIG. 10.

The first image conductor 30 has substantially the shape of a rectangular parallelepiped and comprises:
  two first faces 31 that are planar, mutually parallel and parallel to the plane (O, Y, Z);
  two second faces 32 that are planar, mutually parallel, parallel to the plane (O, X, Z) and perpendicular to the two first planar faces;
  three plates 33 that are planar, semi-reflective and mutually parallel and the normals of which are situated in the plane (O, X, Z) and inclined at a first preset angle; and
  a planar face 34 parallel to the plane (O, X, Y).

Processing of the semi-reflective plates 33 is optimized so that the reflected images have similar luminance levels.

The second image conductor 40 has substantially the shape of a rectangular parallelepiped and comprises:
  two first faces 41 that are planar, mutually parallel and parallel to the plane (O, X, Z);
  two second planar faces 42;
  three plates 43 that are planar, semi-reflective and mutually parallel and the normals of which are situated in the plane (O, X, Y) and inclined at a second preset angle; and
  an entrance face 44 that is planar and parallel to the plane (O, Y, Z). This face is placed beside one of the two faces 31. It should be noted that the juxtaposition of these two faces must be achieved without adaptation of the optical index between the two faces so that total reflection of the light beams can continue to occur inside the first image conductor 30 without the light beams leaking towards the image conductor 40.

Processing of the semi-reflective plates 43 is optimized so that the reflected images have similar luminance levels. It is preferable for their coefficient of reflection to be quite low in order to promote transmission of the landscape.

Figure 6:
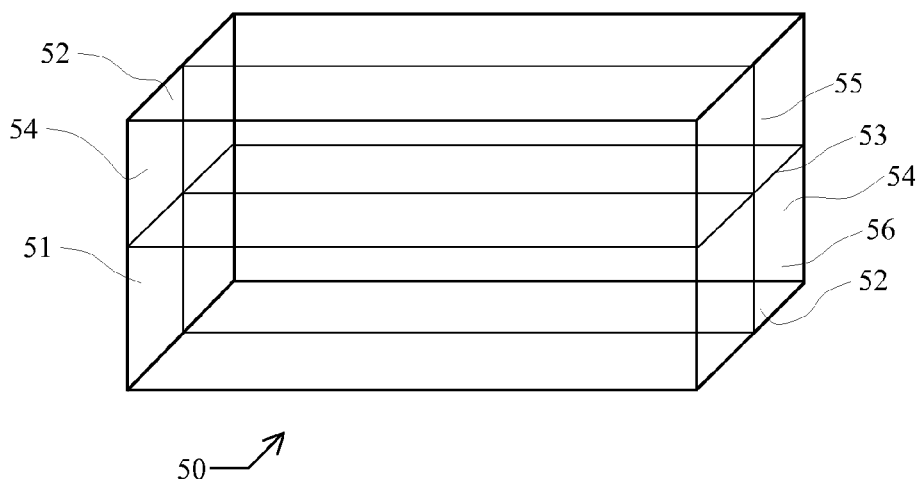
FIG. 6 shows a perspective view of a doubler element according to the invention.

The doubler 50 is identical to that in FIG. 6. It is preferable for the three optical subassemblies 30, 40 and 50 to be made of the same optical material in order to limit the risks of generating parasitic images.

In a first variant shown in FIG. 10, the exit face 56 of the doubler element 50 is adhesively bonded to the face 34 of the first conductor 30.

In a second variant shown in FIG. 11, the exit face 56 of the doubler element 50 is adhesively bonded to one of the faces 32 of the first conductor 30. In this case, the light conductor 30 comprises an inclined mirror 35 making it possible to redirect the beams originating from the doubler.

Even if the optical image guide comprises a large number of primary optical elements assembled with high precision, all these elements remain elementary prisms with planar facets and do not pose any particular problems with shaping, processing or final assembly.

This image guide is intended to operate in a device for displaying collimated images.

What is claimed is:

1. Optical guide for collimated images comprising:
    a first image conductor having substantially the shape of a rectangular parallelepiped and comprising two first faces that are planar and mutually parallel, two second faces that are planar and mutually parallel and perpendicular to the two first planar faces, a plurality of first plates that are planar, semi-reflective, mutually parallel and inclined with respect to the plane of the two first planar faces, and an injection section;
    a second image conductor having substantially the shape of a planar plate comprising two third faces that are planar and mutually parallel and arranged in the extension of the two second planar faces, a fourth face that is planar, perpendicular to the second planar faces and joined to one of the two first planar faces, a plurality of second plates that are planar, semi-reflective, mutually parallel and inclined with respect to the plane of the two third planar faces;
    wherein the guide comprises an optical beam doubler element, said doubler element having substantially the shape of a rectangular parallelepiped, and comprising two first facets that are planar and mutually parallel, two second facets that are planar, mutually parallel and perpendicular to the two first planar facets, at least one first mirror that is semi-reflective, planar and arranged at a first preset distance from one of the two first planar facets and parallel to the latter, at least one second mirror that is semi-reflective, planar and arranged at a second preset distance from one of the two second planar facets and parallel to the latter, a planar entrance face that is intended to receive a collimated image, and an exit face coincident with or in the vicinity of the injection section.

2. Optical guide according to claim 1, wherein the doubler element comprises two first mirrors that are semi-reflective, planar and arranged at two first preset distances from one of the two first planar facets, said two first semi-reflective planar mirrors being mutually parallel and parallel to said first planar facets; and two second mirrors that are semi-reflective, planar and arranged at two second preset distances from one of the two second planar facets, said two second semi-reflective planar mirrors being mutually parallel and parallel to said second planar facets.

3. Optical guide according to claim 1, wherein the doubler element comprises three first mirrors that are semi-reflective, planar and arranged at three first preset distances from one of the two first planar facets, said three first semi-reflective planar mirrors being mutually parallel and parallel to said first planar facets; and three second mirrors that are semi-reflective, planar and arranged at three second preset distances from one of the two second planar facets, said three second semi-reflective planar mirrors being mutually parallel and parallel to said second planar facets.

4. Optical guide according to claim 1, wherein the doubler element comprises four first mirrors that are semi-reflective, planar and arranged at four first preset distances from one of the two first planar facets, said four first semi-reflective planar mirrors being mutually parallel and parallel to said first planar facets; and four second mirrors that are semi-reflective, planar and arranged at four second preset distances from one of the two second planar facets, said four second semi-reflective planar mirrors being mutually parallel and parallel to said second planar facets.

5. Optical guide according to claim 1, wherein the injection section is arranged on the fifth face of the first image conductor.

6. Optical guide according to claim 1, wherein the injection section is situated on one of the two first planar faces or on one of the two second planar faces.

7. Optical device comprising optical means arranged to form a collimated image, and an optical guide according to claim 1, wherein, the collimated image being composed of parallel light beams, the optical means are arranged so that each of the beams is inclined by a non-zero value with respect to the normal to the entrance face, none of the beams possessing any beam symmetrical with respect to said normal.

8. Optical device according to claim 7, wherein the minimum length of the first semi-reflective planar mirror and the minimum length of the second semi-reflective planar mirror are equal to the value of the greatest length of the entrance face divided by the tangent of the minimum angle of inclination of the light beams inside the doubler element.

* * * * *